US006555006B2

(12) United States Patent
van Reis

(10) Patent No.: US 6,555,006 B2
(45) Date of Patent: Apr. 29, 2003

(54) TANGENTIAL-FLOW FILTRATION SYSTEM

(75) Inventor: Robert D. van Reis, Redwood City, CA (US)

(73) Assignee: Genentech, Inc., South San Francisco, CA (US)

( * ) Notice: Subject to any disclaimer, the term of this patent is extended or adjusted under 35 U.S.C. 154(b) by 0 days.

(21) Appl. No.: 10/121,360

(22) Filed: Apr. 12, 2002

(65) Prior Publication Data

US 2002/0108907 A1 Aug. 15, 2002

Related U.S. Application Data

(63) Continuation of application No. 09/693,701, filed on Oct. 19, 2000, now Pat. No. 6,387,270, which is a continuation of application No. 09/501,430, filed on Feb. 10, 2000, now Pat. No. 6,221,249, which is a continuation of application No. 08/767,909, filed on Dec. 17, 1996, now Pat. No. 6,054,051.
(60) Provisional application No. 60/040,912, filed on Jan. 17, 1996.

(51) Int. Cl.⁷ .......................... B01D 61/00; B01D 63/00
(52) U.S. Cl. .................. 210/641; 210/636; 210/321.69; 210/321.75; 210/321.84; 210/195.2; 210/257.2
(58) Field of Search ................................ 210/641, 636, 210/321.69, 257.2, 195.2, 321.75, 321.84, 321.6

(56) References Cited

U.S. PATENT DOCUMENTS

| | | |
|---|---|---|
| 3,599,796 A | 8/1971 | Wilhelm |
| 3,974,068 A | 8/1976 | Ebner et al. |
| 4,139,457 A | 2/1979 | Mackrie et al. |
| 4,212,742 A | 7/1980 | Solomon et al. |
| 4,312,755 A | 1/1982 | Hwang |
| 4,350,594 A | 9/1982 | Kawai et al. |
| 4,369,112 A | 1/1983 | Vincent et al. |
| 4,420,398 A | 12/1983 | Castino |
| 4,664,682 A | 5/1987 | Monzen |
| 4,680,115 A | 7/1987 | La Valley |
| 4,735,726 A | 4/1988 | Duggins |
| 4,755,297 A | 7/1988 | Nerad et al. |
| 4,871,462 A | 10/1989 | Fischel et al. |
| 5,034,135 A | 7/1991 | Fischel |
| 5,147,542 A | 9/1992 | Proulx |
| 5,160,433 A | 11/1992 | Niesen |
| 5,256,294 A | 10/1993 | Van Reis |
| 5,490,937 A | 2/1996 | Van Reis |
| 6,054,051 A * | 4/2000 | Van Reis |
| 6,221,249 B1 * | 4/2001 | Van Reis |
| 6,387,270 B1 * | 5/2002 | Van Reis |

FOREIGN PATENT DOCUMENTS

RU  1748846 A1  7/1992

* cited by examiner

Primary Examiner—Ana Fortuna
(74) Attorney, Agent, or Firm—Ginger R. Dreger; Heller Erhman White & McAuliffe LLP

(57) ABSTRACT

The present invention includes a system and method for transferring a selected solute species from a fluid mixture to a fluid media. The system of the present invention includes a convergent channel for passing a fluid mixture containing a selected species tangentially across the first surface of a porous membrane. A fluid media is directed to flow tangentially over the second surface of the membrane. As the fluid mixture and the fluid media flow on opposite sides of the membrane, the selected species traverses the membrane leaving the fluid mixture and entering the fluid media. The volumetric loss to the fluid mixture associated with the loss of the selected species is compensated for by the convergency of the channel. As a result a constant velocity is maintained over the membrane, maximizing the selectivity of the filtration process.

8 Claims, 3 Drawing Sheets

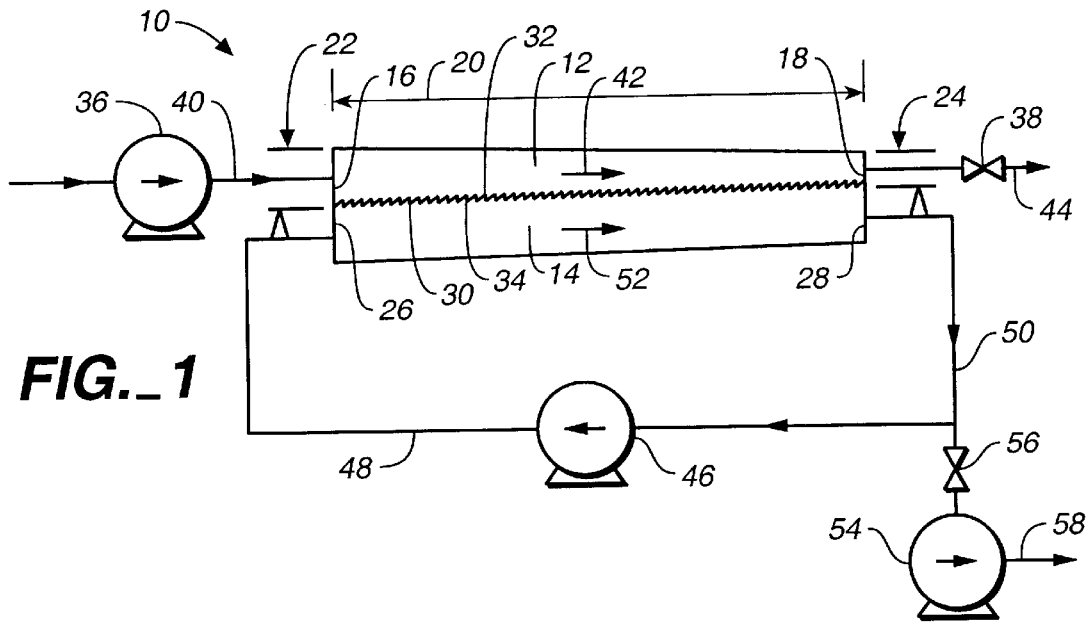
FIG._1
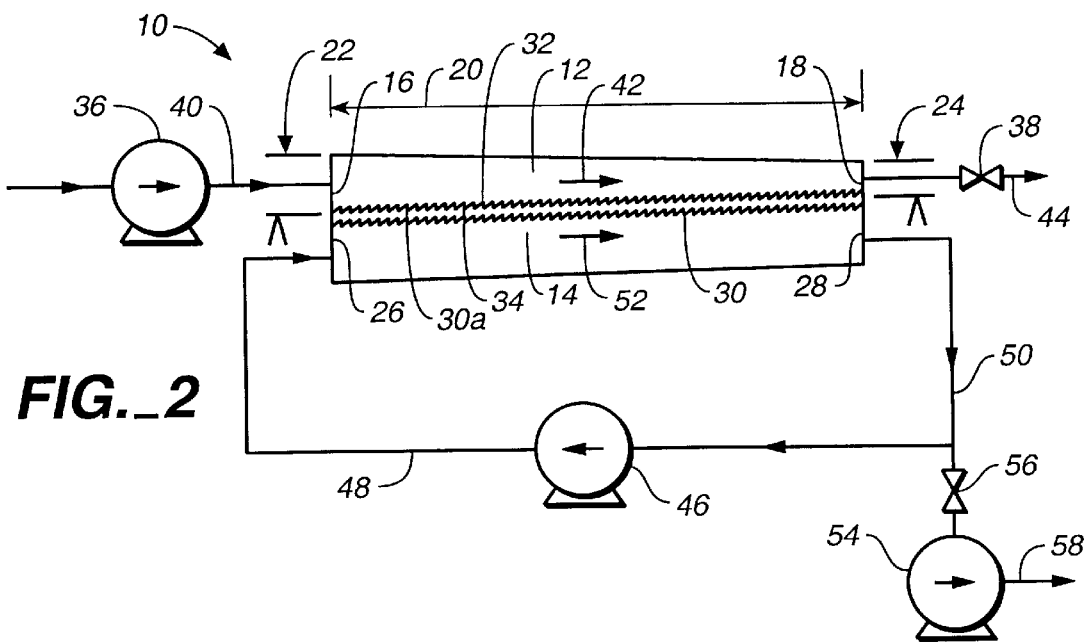
FIG._2

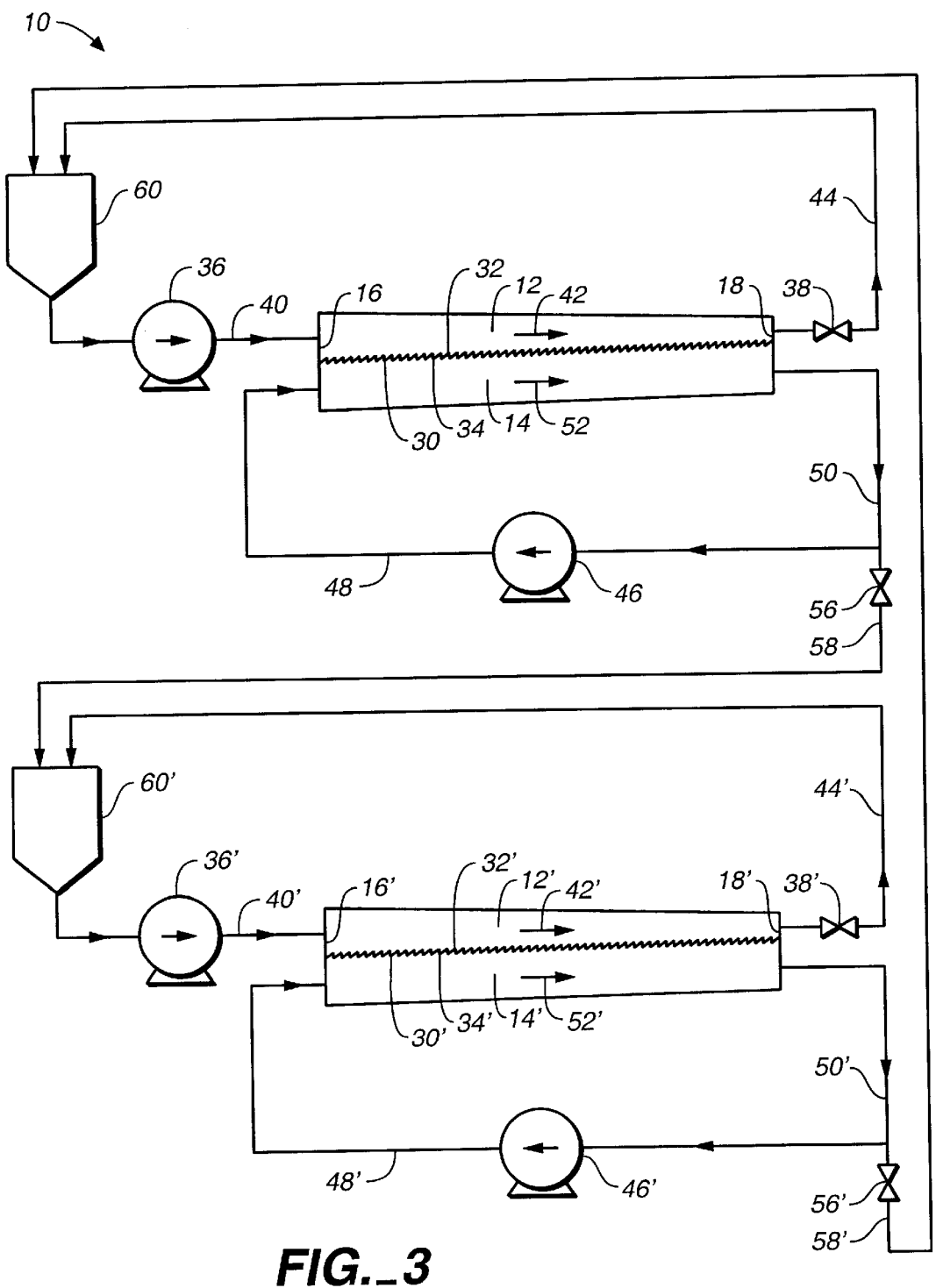
FIG._3

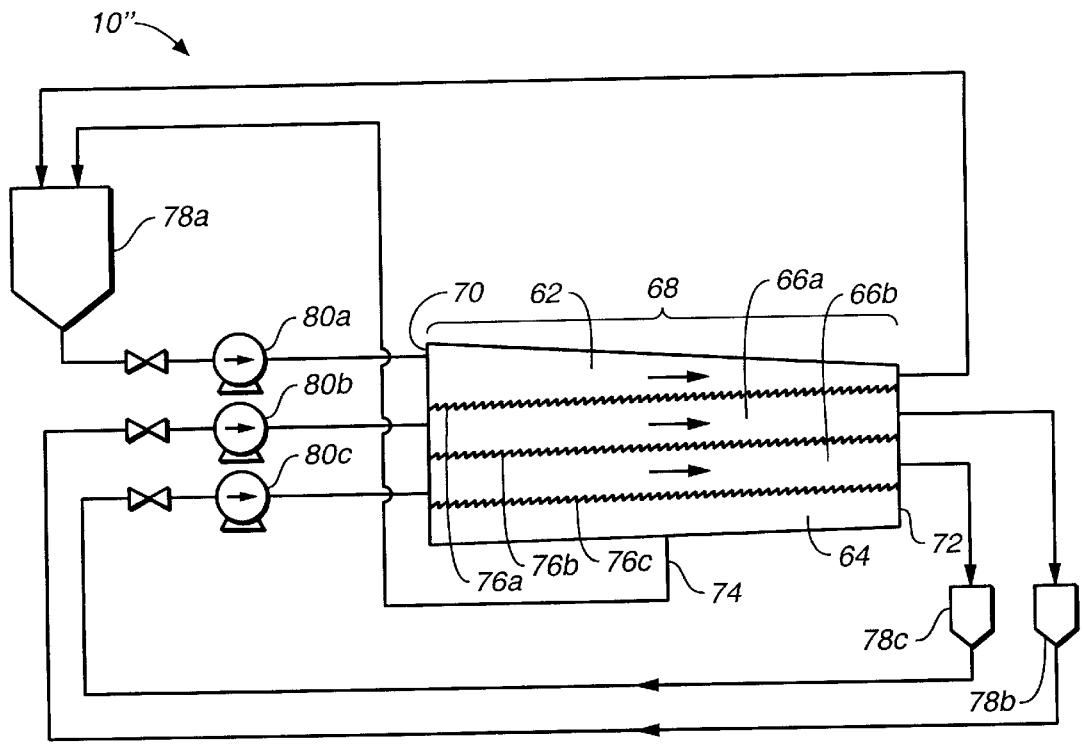
FIG._4
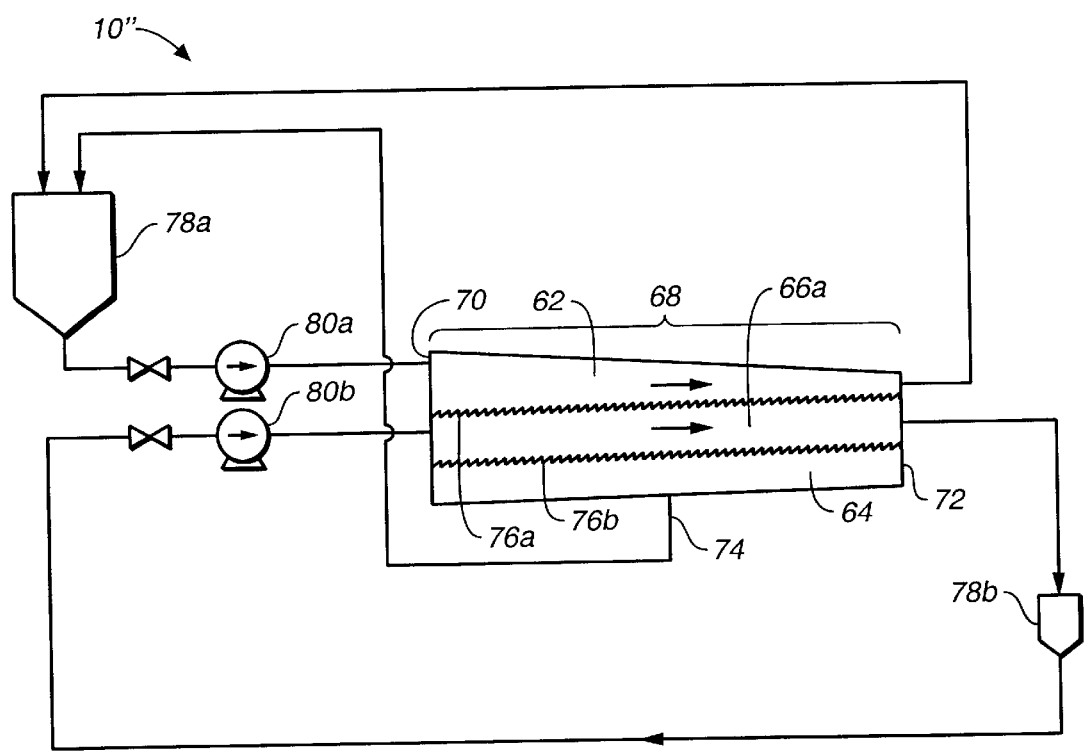
FIG._5

TANGENTIAL-FLOW FILTRATION SYSTEM

RELATED APPLICATION

This application is a continuation application claiming priority to application Ser. No. 09/693,701, filed Oct. 19, 2000, now U.S. Pat. No. 6,387,278 which is a continuation of Ser. No. 09/501,430, filed Feb. 10, 2000, issued as U.S. Pat. No. 6,221,249 on Apr. 24, 2001, which is a continuation of Ser. No. 08/767,909 filed Dec. 17, 1996, issued as U.S. Pat. No. 6,054,051 on Apr. 25, 2000, which claims the benefit of U.S. provisional Application No. 60/040,912 having an effective filing date of Jan. 17, 1996, as per the Petition for Conversion dated Dec. 5, 1996 under 37 CFR 1.53(b)(2)(ii) from U.S. Ser. No. 08/587,644, filed Jan. 17, 1996, the entire disclosures of which are hereby incorporated by reference.

FIELD OF THE INVENTION

The present invention pertains generally to filters which are useful in isolating selected species from fluid mixtures. More specifically, the present invention pertains to tangential-flow filters allowing high protein resolution. The present invention is particularly, but not exclusively, useful as a tangential-flow filter for ultrafiltration of various biological media.

BACKGROUND OF THE INVENTION

In the past, a large number of varying techniques have been developed for the filtration of fluid mixtures. Many of these techniques require passing the fluid mixture through a membrane filter. In general, these membrane filtration techniques may be divided into three basic categories based on filter pore size and filtration pressure. The first of these categories, known as microfiltration, refers to filters having relatively large pore sizes and relatively low operating pressures. The second category, ultrafiltration, refers to filters having intermediate pore sizes and intermediate operating pressures. Finally, the third category, reverse osmosis, refers to filters having extremely small pore sizes and relatively high operating pressures. Predictably, microfiltration techniques are utilized when large solutes, or species, are to be filtered. Ultrafiltration is used when intermediate species are to be processed, and reverse osmosis is utilized when extremely small species are targeted.

Traditionally, membrane filters have functioned by placing a porous membrane perpendicularly across the path of a fluid mixture from which a selected species is to be filtered. The fluid mixture flows through the membrane and the selected species is retained by the membrane. A problem generally associated with traditional filtration techniques is tendency of the filter to accumulate solutes from the fluid mixture that is being filtered. Accumulation of these solutes creates a layer of solutes on the filtration membrane and has a tendency to block, or clog, the pores of the membrane decreasing the flow of the fluid mixture, or flux, through the filtration membrane.

The decrease in flux attributable to the accumulation of the solute layer on the filtration membrane may be partially overcome by increasing the pressure differential, or transmembrane pressure that exists across the filtration membrane. Pressure increases of this type are, however, limited in their effectiveness by the tendency of the filter to become increasingly clogged as the filtration process continues. Eventually, of course, further pressure increases become impractical and the filtration process must be halted and the clogged membrane replaced. This is especially true when biological or other pressure sensitive species are being extracted.

A second problem associated with the accumulation of solutes on the filtration membrane is the tendency for the solute layer to act as a secondary filter. As a result, as the layer of solutes deposited on the filtration membrane increases, passage through the filtration membrane becomes limited to smaller and smaller solutes. The tendency for the solute layer to act as a secondary filter is especially problematic because, unlike the decreased flux attributable to the same layer, it cannot be overcome by increasing the transmembrane pressure.

One solution to the problem of membrane blockage has been the development of tangential-flow filters. Filters of this type employ a membrane which is generally similar to the membrane types employed by traditional filters. In tangential-flow filters, however, the membrane is placed tangentially to the flow of the fluid mixture to cause the fluid mixture to flow tangentially over a first side of the membrane. At the same time, a fluid media is placed in contact with a second surface of the membrane. The fluid mixture and the fluid media are maintained under pressures which differ from each other. The resulting pressure differential, or transmembrane pressure, causes fluid within the fluid mixture, and species within the fluid mixture, to traverse the membrane, leaving the fluid mixture and joining the fluid media.

In operation, the tangential-flow of the fluid mixture over the membrane functions to prevent solutes within the fluid mixture from settling on the membrane surface. As a result, the use of tangential-flow filtration has proven to be an effective means of reducing membrane blockage for membrane filters. Not surprisingly, then, a wide variety of differing designs exist for filters of the tangential-flow type. Unfortunately, even when tangential flow filtration is used, there is still some tendency for solutes to accumulate near the filtration membrane. As is the case with dead-end filters, the accumulation of solutes degrades the filtration process, increases the transmembrane pressure and has the twin effects of decreasing the flux of solutes through the membrane and limiting traversal through the membrane to smaller solutes. These problems are particularly acute when the species of interest and other, non-desired species within the fluid mixture have similar molecular weights, as is often the case when mixtures of proteins are to be fractionated. As a result, tangential flow filtration techniques are generally employed only where the species of interest and the non-desired species have molecular weights which differ by a factor of at least ten.

A tangential flow filtration which optimizes the solute concentration at the filtration membrane to increase the ability of the filter to select between similarly sized species is disclosed in U.S Pat. No. 5,256,294 entitled "Tangential Flow Filtration Process and Apparatus" which issued to van Reis and is assigned to the same assignee as the present invention. For the device disclosed by van Reis, the transmembrane pressure of the filtration process is maintained at a level which is generally less than the transmembrane pressure used in traditional tangential flow filtration systems. More specifically, it has been observed that flux in tangential flow filtration systems increases as a function of transmembrane pressure until the transmembrane pressure reaches a transition point pressure or TPP. Once the transmembrane pressure reaches TPP, flux is relatively independent of further increases in the transmembrane pressure. Traditional tangential flow filtration systems have operated with transmembrane pressure which generally equal or exceed TPP. In comparison, the device disclosed by van Reis maintains the transmembrane pressure of the filtration pressure at a value which is less than TPP. As a result, flux through the device of van Reis may be less than the flux achieved by traditional tangential flow filtration systems. At the same time, however, the ability of the filter to select between similarly sized species is enhanced.

In spite of the development of tangential flow filtration systems and improved tangential flow filtration systems, such as the filtration system disclosed by van Reis, there is a continual need for improved filtration systems. In particular, there exists a need for filtration systems with enhanced abilities to select between similarly sized solutes, such as when mixtures of proteins are to be fractionated. In light of the above, it is an object of the present invention to provide a tangential-flow filtration system for removing solute species from a fluid mixture. Yet another object of the present invention is to provide a tangential-flow filtration system with an enhanced ability to select between similarly size solutes. Yet another object of the present invention is to provide a tangential-flow filtration system which is particularly suitable for the filtration of protein mixtures. Still another object of the present invention is to provide a tangential-flow filtration system which is relatively simple to use, easy to manufacture and comparatively cost effective.

SUMMARY OF THE PREFERRED EMBODIMENTS

The present invention includes a method and system for transferring a selected solute species from a fluid mixture to a fluid media. The system of the present invention includes a filtration membrane preferably formed as a flat, elongated, sheet having a first surface and a second surface. The filtration membrane has a preferred pore size chosen to allow the selected solute species to traverse the membrane. At the same time, the pore size prevents the passage of solutes that exceed the size of the selected species.

The system of the present invention also includes a first channel and a second channel. Both the first channel and the second channel are constructed to allow fluid to flow tangentially across a surface of the filtration membrane. More specifically, the first channel is constructed with an input port and an output port. Fluid, such as the fluid mixture, may enter the first channel at the input port. Between the input port and the output port, the fluid mixture flows tangentially across the first surface of the membrane. The fluid mixture then leaves the first channel at the output port. Similarly, the second channel is constructed with an input port and an output port. Fluid media supplied at the input port of the second channel flows tangentially across the second surface of the filtration membrane before exiting the second channel at the output port. Effectively, as a structural result of the first and second channels, an arrangement is created whereby the fluid mixture and fluid media flow tangentially on opposite sides of the filtration membrane. Generally, the first and second channels may be formed as part of a single cassette which also maintains the position of the filtration membrane.

The present invention also includes a system of pumps connected to the first and second channels. Functionally, the pumping system allows the fluid mixture and the fluid media to be passed through the first and second channels. Additionally, the pumping system allows the velocity in the first and second channels to be selectively controlled. By selectively controlling the velocities in the first and second channels, and by controlling outlet pressures, a pressure differential, or transmembrane pressure, is created over the membrane between the fluid mixture in the first channel and the fluid media in the second channel.

For the purposes of the present invention, numerous types of fluid pumps are adaptable for use in the pumping system. In fact, it may be appreciated that almost any pump that provides the required abilities to move the fluid mixture and fluid media and to control the pressure within the first and second channels may be employed. In practice, however, it will generally be the case that the specific pump type chosen will depend largely on the requirements of the specific filtering operation.

As described in the preceding paragraphs, the present invention includes a pumping system that is used to pass a fluid mixture and a fluid media over opposite surfaces of a porous membrane. The passing of the fluid mixture and the fluid media over opposite sides of the membrane is performed under pressure and causes the selected species in the fluid mixture to traverse the filtration membrane, leaving the fluid mixture and joining the fluid media. Preferably, the pressure of the fluid mixture in the first channel and the pressure of the fluid media in the second channel are controlled to create a transmembrane pressure which is less than the transition point pressure (TPP) of the filtration process.

Importantly, for the purposes of the present invention, the first channel is constructed to be convergent in the direction of the flow of the fluid mixture. Alternatively stated, the first channel is characterized by a cross-sectional area which decreases in the direction of the flow of the fluid mixture. As a result, the geometry of the first channel effectively compensates for the decreasing volume of the fluid mixture caused by the traversal of the filtration membrane by the selected species. More importantly, however, by compensating for the volumetric change of the fluid mixture, the convergent geometry establishes a nearly constant rate of flow for the fluid mixture throughout the first channel. The constant velocity of the fluid mixture throughout the first channel optimizes the ability of the filtration membrane to select between similarly sized solute species.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a schematic diagram of the filtration system of the present invention;

FIG. 2 is a schematic diagram of an alternate embodiment of the filtration system of the present invention;

FIG. 3 is a schematic diagram of the filtration system of the present invention, shown in a cascaded configuration; and FIGS. 4 and 5 are schematic diagrams of the filtration system of the present invention, shown in multi-channel configurations.

DESCRIPTION OF THE PREFERRED EMBODIMENT

The present invention includes a method and system for transferring a selected solute species from a fluid mixture to a fluid media. The filtration system of the present invention is shown in FIG. 1 and generally designated 10. In FIG. 1, it may be seen that the system 10 includes a first channel 12 and a second channel 14. The first channel 12 has an input end 16 and an output end 18. The first channel 12 is characterized by an overall length 20. Additionally, the first channel 12 may be seen to have an initial cross-sectional area 22 measured at the input end 16 and a final cross-sectional area 24 measured at the output end 18. Importantly, for purposes of the present invention, the initial cross-sectional area 22 exceeds the final cross-sectional area 24 giving the first channel 12 a narrowing, or converging, quality over length 20. Like the first channel 12, the second channel 14 has an input end 26 and an output end 28.

Continuing with FIG. 1, it may be seen that a filtration membrane 30 is positioned between, and separates, the first channel 12 and the second channel 14. The filtration membrane has a first surface 32 and a second surface 34. For the purposes of the present invention, the filtration membrane 30 has a porous quality and, preferably, is characterized by a uniform pore size. The specific material and the specific pore size chosen for the filtration membrane 30 depends on the size of the solute species that will be removed by the filtration system 10. In general, many configurations are possible for first channel 12 and second 14. For example, as shown in FIG. 1, for the preferred embodiment of the present invention, the first channel 12 and tore second channel 14 are configured in a side-by-side relationship. Alternatively, the first channel 12 and second channel 14 may be configured to be coaxially disposed with either the first channel 12 or second channel 14 positioned inside of the other. In fact, any configuration of the first channel 12 and second channel 14 that forces the fluid mixture and fluid media to flow tangentially over opposite sides of a filtration membrane and provides the required convergent configuration for the first channel 12 may be adapted for use in the present invention.

The present invention may also include a feed pump 36 and valve 38. The feed pump 36 is connected to an input conduit 40 which connects, in turn to the input end 16 of the first channel 12. For the purposes of the present invention, numerous types of fluid pumps are adaptable for use as feed pump 36. In fact, it may be appreciated that almost any pump type that provides the required abilities to move the fluid mixture and control the pressure within the first channel 12 may be employed. Functionally, the feed pump 36 causes the fluid mixture to pass through the input conduit 40 and into the input end 16 of the first channel 12. Once in the first channel 12, the fluid mixture passes along the length 20 of the first channel 12 in the direction of the arrow 42. A mixture output conduit 44 is connected at the output end of the first channel 12 providing a path for removal of the fluid mixture from the first channel 12.

A recirculating pump 46 is also included in the present invention. The recirculating pump 46 is attached to a recirculation conduit 48 which is connected, in turn, to the input end 26 of the second channel 14. The recirculating pump 46 is also connected to a return conduit 50 which is connected, in turn, to the output end 28 of the second channel 14. As may be appreciated by reference to FIG. 1, operation of the recirculating pump 46 forces a stream of fluid media through the recirculation conduit 48 and into the second channel 14. The fluid media flows through the second channel 14 in the direction indicated by the arrow 52. The fluid media then enters the return conduit 50 at the output end 28 of the second channel 14. The return conduit 50 then conveys the fluid media back to the recirculating pump 46.

As described in the preceding paragraph, the recirculating pump 46, recirculation conduit 48, second channel 14 and return conduit 50 form a circuit through which fluid media may be continuously circulated. To add or subtract fluid media from the system 10, an extraction pump 54, or valve 56, are connected to a media output conduit 58.

OPERATION

In operation of the present invention, feed pump 36 is used to pass a fluid mixture containing a selected solute species to be filtered through input conduit 40 and into first channel 12. The fluid mixture passes through first channel 12 in the direction indicated by arrow 42. Within the first channel 12, the fluid mixture passes tangentially over the first surface 32 of the filtration membrane 30. As the fluid mixture passes through first channel 12, the feed pump 36 and valve 38 maintains the fluid mixture at a predetermined operational pressure. After flowing the length 20 of the first channel 12, the fluid mixture exits the first channel 12 through the mixture output conduit 44. For the purposes of the present invention, processing of the fluid mixture may proceed as a batch or continuous process. In cases where a continuous process is to be utilized, the system 10 shown in FIG. 1 is used to pass the fluid mixture through the first channel 12 as described. In cases where a batch process is to be used, however, the fluid mixture must be forced to repeatedly flow through the first channel 12. In such cases, the system of FIG. 1 may be reconfigured to establish a connection between the mixture output conduit 44 and the feed pump 36.

As the feed pump 36 is causing the fluid mixture to flow through the first channel 12, a fluid media is being recirculated in the second channel 14. More specifically, the recirculating pump 46 simultaneously withdraws fluid media from the return conduit 50 and passes fluid to the recirculation conduit 48. As a result, fluid media is withdrawn from the output end of 28 of the second channel 14 and added at the input end 26 of the second channel 14. The overall result is that the fluid media flows through the second channel 14 in the direction of the arrow 52. Within the second channel 14, the fluid mixture passes tangentially over the second surface 34 of the filtration membrane 30. As the fluid mass passes through second channel 14, the recirculating pump 46, extraction pump 54 or valve 56 maintain the fluid media at a predetermined operational pressure. As a result of the predetermined operational pressure within the first channel 12 and the predetermined operational pressure within the second channel 14, a pressure differential, or transmembrane pressure, is applied across the filtration membrane 30. For the purposes of the present invention, the transmembrane pressure of the filtration process is maintained at a value that lies between five and one-hundred percent (5–100%) of the transition point pressure (TPP) of the filtration process, where TPP is defined as a pressure above which flux through the filtration membrane 30 is no longer dependent on the transmembrane pressure.

As the fluid mixture and fluid media flow on opposite sides of the filtration membrane 30, the selected solute species traverses the filtration membrane 30, leaving the fluid mixture and joining the fluid media. The rate at which the selected species traverses the filtration membrane 30 is dependent on a number of factors. These factors include: the particular species, the constituents of the fluid mixture and fluid media, the flow rate of the fluid mixture and fluid media, the physical characteristics of the filtration membrane 30, the pressure in the first channel 12 and the second channel 14, and the temperature of the fluid mixture and fluid media.

As the selected species traverses the filtration membrane 30, the volume occupied by the fluid mixture is effectively decreased. Importantly, in the present invention, the loss of volume of the fluid mixture within the first channel 12 is matched by the convergent geometry of the first channel 12. More specifically, for the present invention, the initial cross-section 22, final cross-section 24 and length 20 of the first channel 12 are chosen to produce an overall geometry for the first channel 12 which compensates for the loss of the fluid volume of the fluid mixture due to traversal of the selected species through the filtration membrane 30. By compensating for the loss of the selected species, the velocity at which the fluid mixture flows through the first channel 12 is maintained at a substantially constant rate throughout the first channel 12.

In contrast to the volume of the fluid mixture, the volume occupied by the fluid media effectively increases as the selected species traverses the filtration membrane 30. This increase in volume is compensated for by operation of the extraction pump 54 which withdraws excess fluid media, now containing the selected solute species, from the system 10. In this fashion, the selected species is removed from the fluid mixture and added to the fluid media. Generally, it may be appreciated that either the resulting fluid media (now carrying the selected species) or the fluid mixture (now stripped of the selected species) may form the end-product of the filtration process.

A first alternate embodiment for the present invention is shown in FIG. 2. In FIG. 2, it may be seen that the system 10 of the present invention includes all of the elements previously referred to in FIG. 1. In FIG. 2, however, an additional filtration membrane 30a has been added. Filtration membrane 30a is preferably of the same type and pore size as filtration membrane 30. Filtration membrane 30a is also positioned in substantially the same location as filtration membrane 30. In effect, the combination of filtration membrane 30 and filtration membrane 30a shown in FIG. 2 provides a double layer filter which replaces the single layer filter of FIG. 1 Functionally, inclusion of one or more additional filter layers, such as filtration membrane 30a functions to prevent the minor filter defects associated with commercial grade membrane filters from allowing non-selected species to traverse from the first channel 12 to the second channel 14.

The system 10 shown in FIG. 1 as well as the alternate embodiment shown in FIG. 2 are adaptable for use in varying cascaded configurations. For example, in FIG. 3, the filtration system 10 of FIG. 1 is replicated to form a two-stage, cascaded, configuration In more detail, FIG. 3 shows a first filtration system, generally designated 10, and a second filtration system, generally designated 10'. Both first filtration system 10 and second filtration system 10' are fitted with an input reservoir designated 60 and 60' respectively. Additionally, the extraction pump 54 shown in FIG. 1, is omitted from system 10 and system 10'.

Continuing with FIG. 3, it may be seen that the system 10 and the system 10' are configured to continuously reprocess the fluid mixture. Therefore, mixture output conduit 44 is connected to reservoir 60. Likewise, mixture output conduit 44' is connected to reservoir 60'. This allows the fluid mixture in system 10 and system 10' to be continuously recirculated through the respective first channel 12 and first channel 12'. To cascade the filtration system 10 and the filtration system 10' the media output conduit 58' is connected to reservoir 60 and the media output conduit 58 is connected to reservoir 60'. Preferably, the pore size chosen for filtration membrane 30' is smaller than the pore size chosen for filtration membrane 30.

The system 10 shown in FIG. 1 as well as the alternate embodiment shown in FIG. 2 are adaptable for use in multi-channel integrated systems. For example, in FIG. 4, the basic filtration system 10 of FIG. 1 has been replicated to form a multi-channel system 10". Structurally, multi-channel system 10" includes a first channel 62 and a last channel 64. Between, first channel 62 and last channel 64, system 10" includes a series of intermediate channels 66 of which intermediate channels 66a and 66b are exemplary. Together, first channel 62, last channel 64 and intermediate channels 66 form a layered sequence of channels 68. It should be appreciated that the number of intermediate channels 66 is variable to suit the ends to which a particular system is directed. Therefore, in FIG. 4, two intermediate channels are included while in FIG. 5, a configuration having only a single intermediate channel is shown. Within the layered sequence 68, first channel 62 and intermediate channels 66 are configured as recirculating channels and have an input end 70 and an output end 72. In comparison, last channel 64 is configured as a non-recirculating channel which lacks the input end 70 and output end of first channel 62 and intermediate channels 66. Last channel 64 is, however, formed to include an output 74. Importantly, for the purposes of the present invention, first channel 62 is formed to be convergent between input end 70 and output end 72. It is to be appreciated that the convergent geometry shown for first channel 62 is the same type of convergent geometry as used for first channel 12 of system 10 shown in FIG. 1.

System 10" also includes a series of filtration membranes 76 of which membrane 76a, 76b and 76c are exemplary. Each filtration membrane 76 is positioned to between a pair of channels within the layered sequence of channels 68. For example, filtration membrane 76a is positioned to separate first channel 62 and intermediate channel 66a. Likewise, filtration membrane 76b is positioned to separate intermediate channel 66a and intermediate channel 66b. Each filtration membrane 76 is generally of the same type as filtration membrane 30 shown in FIG. 1. For the purposes of multi-channel filtration system 10", however, each individual filtration membrane 76 is chosen to have a specific pore size Additionally, the filtration membranes 76 are arranged so that each successive filtration membrane 76 has a smaller pore size. In this fashion, filtration membrane 76c has a smaller pore size than filtration membrane 76b. Filtration membrane 76b, in turn, has a pore size that is smaller than the pore size of filtration membrane 76a.

System 10" also includes a series of reservoirs 78 of which reservoirs 78a, 78b and 78c are exemplary, and a series of recirculation pumps 80 of which recirculation pump 80a, 80b and 80c are exemplary. As shown in FIG. 4, one recirculation pump 80 and one reservoir 78 are connected to recirculate fluid mixture between the output end 72 and input end 70 of the recirculating channels included in the layered sequence of channels 68. For example, recirculation pump 80a and reservoir 78a are connected between the output end 72 and the input end 70 of first channel 62. Likewise, recirculation pump 80b and reservoir 78b are connected between the output end 72 and the input end 70 of intermediate channel 66a. In this fashion, each recirculation pump 80 and reservoir 78 operate to establish a recirculating flow of fluid mixture from the input end 70 to the output end 72 of the recirculating channels included in the layered sequence of channels 68.

Continuing with FIG. 4, it may be seen that last channel 64 lacks the recirculating flow of intermediate channels 66. In the case of last channel 64, however, it may be seen that output 74 is connected in fluid communication with reservoir 78a.

In operation of system 10 recirculation pumps 80a and reservoirs 78a continuously recirculate a fluid mixture through first channel 62. As the fluid mixture recirculates through first channel 62, fluid and species which are not retained by the filtration membrane 76a pass through the filtration membrane 76a and enter intermediate channel 66a. In this fashion, the fluid mixture recirculated through first channel 62 becomes increasingly composed of those species that are retained by the filtration membrane 76a.

Importantly, the convergent geometry of first channel 62 compensates for the loss of the fluid volume of the fluid mixture due to traversal of fluid and species through the filtration membrane 76a. By compensating for the loss of the fluid volume, the velocity at which the fluid mixture flows through the first channel 62 is maintained at a substantially constant rate throughout the first channel 62.

In cooperation with the fluid mixture flow in first channel 62, recirculation pumps 80 and reservoirs 78 operate to continuously recirculate fluid mixture through each intermediate channel 66. As the fluid mixture recirculates through each intermediate channel 66, fluid and species which are not retained by filtration membranes 76 leave intermediate channel 66 and enter the next intermediate channel 66 or last channel 64. In this fashion, the fluid mixture recirculated through each intermediate channel 66 becomes increasingly composed of those species that are retained by a particular filtration membrane 76. The loss of fluid and species from each intermediate channel 66 is offset by an influx of fluid and species from the channel within the layered sequence 68 which immediately precedes the particular intermediate channel 66. In this fashion, the velocity at which the fluid mixture flows through each intermediate channel 66 is maintained at a substantially constant rate at all points within the intermediate channels 66.

Effectively, then, operation of the system 10 will act to stratify the fluid mixture, placing the largest species in first channel 62, smaller species in intermediate channel 66a and still smaller species in each subsequent intermediate channel 66. With the exception of the final filtration membrane within the layered sequence 68, recirculation pumps 80 preferably maintain the transmembrane pressure over each filtration membrane 76 at a value that lies between five and one-hundred percent (5–100%) of the transition point pressure (TPP) of the filtration process. As a result of the controlled transmembrane pressure and the constant velocity of flow within each channel of layered sequence 68, the ability of the multi-channel system 10″ to select between similarly sized species is enhanced.

While the particular method and system for transferring a selected solute species from a fluid mixture to a fluid media as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. A tangential-flow filtration apparatus separating a fluid mixture into species of interest in a cascade mode, the apparatus comprising:

first filtration system and a subsequent filtration system, each of the filtration systems comprising:

a cassette formed with a layered sequence of side-by-side channels including a convergent first channel, a last channel, and, between the first channel and the last channel, series of intermediate channels, the convergent first channel and at least one intermediate channel being configured as recirculating channels having an inlet and outlet, the last channel being configured as a non-recirculating channel having an outlet;

a series of filtration membranes, one filtration membrane positioned between each successive pair of channels in the layered sequence with each successive pair of channels in the layered sequence being separated by a filtration membrane having a successively smaller pore size;

means for creating a flow of the fluid mixture between the inlet and the outlet of each recirculating channel of each first and subsequent filtration system in the direction of tangential flow; and means for creating a pressure differential between each successive pair of channels in the layered sequence;

the apparatus further comprising a means for directing fluid media from the last channel of the filtration system to the first channel of the subsequent filtration system.

2. A tangential-flow filtration apparatus as recited in claim 1 wherein the cassette is formed to include one intermediate channel.

3. A tangential-flow filtration apparatus as recited in claim 1 wherein the cassette is formed to include two intermediate channels.

4. A tangential-flow filtration apparatus as recited in claim 1 wherein the outlet of each recirculating channel is connected in fluid communication to the inlet of the channel.

5. A tangential-flow filter as recited in claim 1 wherein the velocity of the flow of the fluid mixture is substantially constant within each recirculating channel.

6. A tangential-flow filter as recited in claim 1 wherein the pressure differential between each successive pair of recirculating channels in the layered sequence is maintained at a value which is less than the transition point pressure (TPP) of the tangential-flow filter.

7. A tangential-flow filter as recited in claim 1 wherein the convergent first channel is dimensioned so that the pressure differential between the convergent first channel and the intermediate channel is substantially constant over the length of the filtration membrane positioned between the convergent first channel and the intermediate channel by the species.

8. A tangential-flow filter as recited in claim 1 wherein the convergent first channel is dimensioned to compensate for volumetric changes to the fluid mixture caused by the traversal of the filtration membrane positioned between the convergent first channel and the intermediate channel by the species.

* * * * *